July 27, 1954   R. L. ALLEN ET AL   2,684,781
SEED PLANTER
Filed May 28, 1947

INVENTOR
ROBERT L. ALLEN
JOHN GORDON FUTRAL
BY
Semmes, Keegin, Robinson & Semmes
attorneys

Patented July 27, 1954

2,684,781

UNITED STATES PATENT OFFICE 2,684,781

SEED PLANTER

Robert L. Allen, Atlanta, and John Gordon Futral, Experiment, Ga., assignors to Georgia Tech Research Institute, Atlanta, Ga., a corporation of Georgia Application May 28, 1947, Serial No. 751,036

3 Claims. (Cl. 221—1)

This invention relates to seed planting machines, and more particularly to a machine for planting seeds with uniform, regular spacing.

Agriculture is an industry which is closely allied to and highly dependent upon the basic sciences of biology, chemistry, geology and the engineering sciences. Knowledge of the composition and the chemical and physical demands of plant life is not, in itself, sufficient for the proper production of large food crops. Especially when agriculture is carried out on a large scale, it is essential that equipment be used which has been designed and built in accordance with scientific principles, so that the food crop produced through use of this equipment may be of the highest quality and quantity.

The mechanization of agricultural operations is a step toward emancipation of the farmer from some of the remaining vestiges of primitive, backbreaking toil. Also, when properly applied, it makes possible the proper spacing of plants, high-speed planting at the right time (which may be very short), and rapid and efficient harvesting.

Fundamental to the progress of agriculture are improvements in the methods employed in the planting of seeds. Research concerning the optimum spacing of peanut seeds for good crop yields has been conducted by the Georgia Agricultural Experiment Station. This research showed that seeds of the Spanish peanut, when spaced approximately three inches apart in rows separated by 24 to 30 inches, gave a typical yield of 1,550 pounds per acre, whereas a six-inch spacing yielded only 1,250 pounds per acre and a twelve-inch spacing gave only 990 pounds. For the runner type of plant, the optimum spacing was found to be about six inches in rows placed 30 inches apart.

Standard planting equipment is now available which will theoretically plant peanut seeds at spacings as close as 1½ inches. However, at the high planting speeds commonly used in large fields during the rush to plant at the right time, these close spacings cannot be realized.

Various types of seed planting machines have been used in the past. In some of these, seeds are picked up from a hopper in apertures in a belt and the belt passes under a retainer plate or a similar closure to remove excess seeds. This retainer plate frequently damages the excess seeds, oversized seeds, or any seeds which may be caught endwise in the apertures. Although seeds, such as peanuts, are commonly thought of as being rather durable, even a small break in their outer coverings, or skins, will prevent germination.

Other types of planters throw the seeds from an inclined rotating disc by centrifugal force, leaving them to fall freely through a chute. These planters do not plant the seeds with accurate spacing because the seeds begin to fall through the chute without a uniformly imparted velocity. They fall to the ground a comparatively long distance through the chute and, in doing so, may spiral through the chute at different rates of speed, and for this reason their spacing in the ground is inaccurate. Moreover, the rapid rotation of the planting plates which serve to pick up the seeds from the supply hopper causes an erratic action, since the seed pockets are often emptied by centrifugal force before reaching the planting tubes. Furthermore, at high planting speeds the planting plates rotate too rapidly to pick up the seeds effectively. The result of this erratic action is irregular bunching of the seeds on the ground instead of regular spacing. The desired and important uniformity of close spacing is thus lost, and a decrease in crop yield is the inevitable result. It should be noted that the problem encountered here—the planting of seeds spaced, for example, 2½ inches apart by a machine moving, for example, six miles per hour—is by no means a simple one. Under these conditions, the planter must accurately deposit about 42 seeds per second, one at a time and without damage to the seeds.

One object of this invention is to provide a seed planter which plants seeds with uniform, regular spacing.

Another object is to provide a seed planter which does not cause damage to the seeds, whether they be excess seeds, oversized seeds, or seeds which are caught endwise in the apertures of the pickup belt.

A further object of this invention is to provide a seed planter which can be readily adapted to plant seeds of various sizes.

Still another object is to provide a seed planter which discharges the seeds close to the ground while imparting to them an appreciable downward velocity.

A still further object is to provide a device which will plant seeds rapidly as well as with accurate spacing.

Other objects will be apparent from the following description, when read in conjunction with the accompanying drawing, in which.

Figure 1:
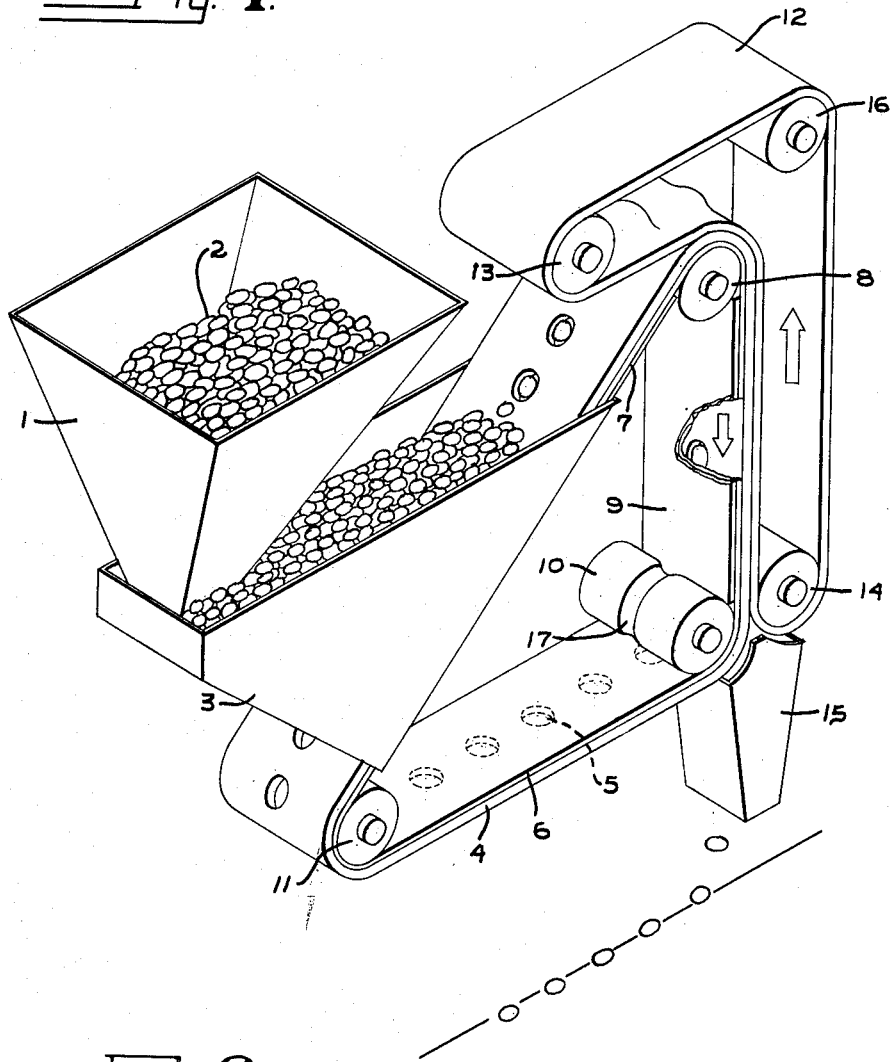
Figure 1 is a perspective view of a preferred embodiment of the invention.
Figure 2:
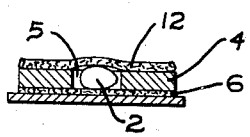
Figure 2 is a horizontal sectional view of the pickup belt, retainer plate, and retainer belt, showing a seed in place.

This apparatus comprises a mechanism or series of mechanisms for planting seeds, mounted on a suitable vehicle, which may be either pushed or pulled by a prime mover, such as a tractor, horse, or by hand, or which may be self-propelled. In either case, the power necessary to drive the planting mechanism may be obtained by suitable connection to the running gear or from a self-contained source, such as a small gasoline engine. It is also practical to drive the planting mechanism from a wheel running on the ground, with the planter being pulled or pushed by another vehicle.

In the drawing, the numeral 1 designates a supply hopper into which the seeds 2 are placed. The seeds are fed by gravity from the supply hopper 1 to a pickup hopper 3 in such a manner that the pickup hopper is kept filled to a constant level.

One side of the pickup hopper 3 is inclined, as illustrated in the drawing, at an angle of approximately 45 degrees, and over this inclined side an endless pickup belt 4 slides upwardly through the bottom of the pickup hopper 3. The belt 4 enters the hopper 3 at the bottom of the latter through a slot which is just large enough to permit the belt to pass through without binding, and yet is not large enough to permit seeds to escape between the side of the slot and the belt. The belt 4 is formed with a series of uniformly spaced apertures 5 extending throughout its entire length. Each aperture 5 extends through the belt from one side to the other and is of sufficient diameter to accommodate one seed of the type to be planted. The thickness of the belt 4, and accordingly the depth of the apertures 5, is also chosen to accommodate the size of the particular seeds to be planted. The belt is just thick enough to retain one seed in each hole 5 and at the same time is thin enough to cause any additional seeds to fall out of the shallow holes 5 at the selected angle of inclination.

The belt 4 is interchangeable with other belts having different thicknesses and having apertures 5 of different diameters so as to accommodate seeds of different sizes. It is also within the scope of this invention to provide belts 4 having two or more apertures 5 side by side in the pickup belt, so that they would discharge simultaneously, as in the case where two or more seeds are to be planted at the same time. It is further within the scope of this invention to provide belts 4 having apertures 5 spaced alternately in double rows (i. e., staggered) or several rows as well as side by side or in one row. Such staggered spacing keeps the belt speed lower when close spacing is desired at high planting speeds.

The belt-supporting side of the hopper 3, and consequently the pick-up belt 4, are inclined at a critical angle such that excess seeds not fitting into the aperture 5 fall back inot the hopper 3 as the belt 4 moves upwardly above the top of the mass of seeds in the hopper. This angle is in the neighborhood of 45 degrees, but varies somewhat due to differences in seed size and consequent differences in thickness of the belt 4 and diameter of the apertures 5. This method of separating excess seeds virtually eliminates the possibility of damaging the skin of the seed and is particularly important in the case of seeds having fragile skins, such as peanuts. By avoiding injury to the skins of seeds, the germination of every seed is made more reliable.

The pickup belt 4 may, if desired, have a fabric or other suitable backing 6 to prevent the seeds from scraping against the surfaces over which the belt passes. This is particularly important in the case of seeds having fragile skins, such as peanuts.

The pickup belt 4 may be made of any suitable material, such as leather, or may be made of metal links in the form of an endless chain with seed openings either in interwalled links or in all of the links.

In the embodiment of the invention illustrated in the drawing, the pickup belt 4 moves in an approximately triangular path. It passes upwardly from the pickup hopper 3 along an extension 7 of the inclined side of the hopper, the extension serving to support the belt and, when the belt does not have a fabric backing 6, to hold the seeds 2 in place in the apertures 5. The extension 7 terminates adjacent to a roller 8, over which the belt 4 passes. From the roller 8 the belt moves downwardly in contact with a retainer plate 9, which extends from a point near the roller 8 to a point adjacent a lower roller 10. The belt passes about the roller 10 and horizontally to a third roller 11, moving around the latter and then upwardly again through the pickup hopper 3. The belt 4 may be driven by and one of the rollers 8, 10 or 11 as described above, either from a conventional power take-off of a tractor, a wheel on which the planter is supported, or a self-contained motor.

In order to hold the seeds 2 in place in the apertures 5 as the pickup belt 4 moves over the roller 8 and along the retainer plate 9, there is provided an endless retainer belt 12. This retainer belt may be made of any suitable soft, flexible, material, such as rubber or fabric, so that it will not mash or break the seeds. The belt 12 is unperforated and passes around a roller 13, which is so located with respect to the roller 8 that belt 12 meets the pickup belt 4 just before the latter passes over the roller 8. The retainer belt 12 remains in contact with the pickup belt 4 as the latter moves from the roller 8 along the retainer plate 9 to the roller 10, thereby retaining the seeds 2 in place in the apertures 5 between the belt 12 and the backing 6 or between the belt 12 and the roller 8 and the retainer plate 9, if there is no backing on the pickup belt 4. As the belt 4 reaches the roller 10, the retainer belt 12 separates from it and moves in the opposite direction over a roller 14. The seeds 2 are thus free to leave the apertures 5 and are thrown tangentially therefrom through a planting tube or chute 15 as the belt 4 moves over the roller 10 at a high rate of speed. In this manner a high velocity in a downward direction is imparted to the seeds and therefore no tendency on the part of the seeds to spiral exists. The roller 10 is mounted close to the ground so that the seeds have only a short path of free fall between the belt 4 and the ground. Traversing this short distance at a high speed, the seeds become accurately spaced, resulting in increased crops per acre as already described.

The retainer belt 12, after passing around the roller 14, moves upwardly to a roller 16, over which it passes in returning to the roller 13 to repeat its path. The retainer belt may be driven by friction from the pickup belt 4 or by any one of the rollers 13, 14 or 16, over which it passes in returning to the rollers 13 to repeat its path. The retainer belt may be driven by friction from the pickup belt 4 or by any one of the rollers 13, 14 or 16 from the same source of power which drives the pickup belt 4 and at the same velocity as the pickup belt.

The rollers 8 and 10 may, if desired, be formed with shallow grooves 17 in registry with the apertures 5 of the pickup belt 4, in order to avoid crushing of the seeds 2. Some or all of the rollers may be crowned, flanged, or troughed in order to maintain the belt in position. The number of rollers over which each belt passes may be varied from that shown in the drawing. For example, the pickup hopper 3 can be located at any point on the machine and, by providing a suitable number of rollers and retainers at suitable locations, the discharge point can be located at any other point on the machine.

It will be understood that more than one row of seeds may be planted at a time by using two or more planting machines in combination.

This seed planter can be adapted for planting seeds of various sizes by changing the pickup belt 4. The seeds are carried to within a few inches of the ground and discharged with a downward velocity. The distance of free fall is reduced to a minimum, and there can be no tendency of the seeds to spiral. This insures much more even spacing of the seed hills.

The speed with which this device can pick up and discharge seeds with reasonable accuracy is much greater than that of existing machines. Also, the seeds are handled much more gently, and breakage or damage to seeds is practically eliminated. Moreover, there is no tendency for the planter to deposit more than one seed at a time unless this is specifically provided for by use of specially arranged apertures 5, as previously described.

It will be understood that the apparatus of the invention is not limited in use to planting seeds but may be used for other purposes in other applications. For example, the machine may be used to deposit pellets, or wherever there may be a need for such a mechanism.

We claim:

1. A high speed seed planter comprising a pickup hopper, a supply hopper arranged to feed seed to said pickup hopper in a manner to keep the same filled to a constant level, said pickup hopper having an inclined side, a pickup belt arranged to move through said pickup hopper and upwardly over said inclined side to pick up seed in spaced apertures in said belt, said inclined side of said pickup hopper being inclined at such an angle that seed which do not enter said apertures fall back into said pickup hopper, said pickup belt being arranged to pass substantially vertically downward after leaving said pickup hopper to discharge the seed with a substantially vertically downward motion and then again pass upwardly through said pickup hopper, a retainer belt overhanging the uppermost travel of said pickup belt and holding seed positively in place in the apertures of said pickup belt, said retainer belt being arranged to move in contact with said pickup belt throughout its downward movement to a point of discharge adjacent ground level and to disengage said pickup belt at the bottom of its downward traverse to impart a substantially vertically downward velocity to the seed as they are discharged from the planter.

2. The method of planting seed comprising picking up said seed by gravity, holding the seed picked up while imparting thereto substantially vertically downward velocity greater than the velocity of free fall, and maintaining said velocity while releasing said seed to which said velocity has been imparted adjacent ground level and in a substantially vertically downward direction.

3. The method of planting seed comprising picking up said seed by gravity, holding the seed picked up while imparting thereto substantially vertically downward velocity greater than the velocity of free fall, and maintaining said velocity while releasing said seed to which said velocity has been imparted into a prepared furrow and in a substantially vertically downward direction.

References Cited in the file of this patent

UNITED STATES PATENTS

| Number | Name | Date |
|---|---|---|
| 262,439 | Lindsay | Aug. 8, 1882 |
| 467,683 | Essex | Jan. 26, 1892 |
| 874,037 | Schreiber | Dec. 17, 1907 |
| 1,452,912 | Hartenstein | Apr. 24, 1923 |
| 1,761,065 | Bausman | June 3, 1930 |
| 2,440,846 | Cannon | May 4, 1948 |
| 2,510,658 | Rossmann | June 6, 1950 |

FOREIGN PATENTS

| Number | Country | Date |
|---|---|---|
| 140,749 | Germany | Apr. 28, 1903 |
| 200,193 | Great Britain | July 6, 1923 |
| 262,526 | Germany | Aug. 22, 1911 |